United States Patent
Schwalbe et al.

(10) Patent No.: US 10,266,209 B2
(45) Date of Patent: Apr. 23, 2019

(54) ENGINE COMPARTMENT SIDE PANEL WITH TOOLLESS MOUNTING

(71) Applicant: CNH Industrial America LLC, New Holland, PA (US)

(72) Inventors: Blaine Schwalbe, Valders, WI (US); Ross Christiansen, Kiel, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 77 days.

(21) Appl. No.: 15/657,877

(22) Filed: Jul. 24, 2017

(65) Prior Publication Data

US 2019/0023325 A1    Jan. 24, 2019

(51) Int. Cl.
*B62D 25/12* (2006.01)
*B62D 25/08* (2006.01)
*B62D 27/06* (2006.01)

(52) U.S. Cl.
CPC ........... *B62D 25/12* (2013.01); *B62D 25/082* (2013.01); *B62D 27/065* (2013.01); *B60Y 2200/22* (2013.01); *B60Y 2304/07* (2013.01)

(58) Field of Classification Search
CPC .... B62D 25/12; B62D 25/082; B62D 27/065; B60Y 2304/07; B60Y 2200/22
See application file for complete search history.

(56) References Cited

U.S. PATENT DOCUMENTS

| | | | |
|---|---|---|---|
| 3,918,540 A | 11/1975 | Haupt | |
| 4,371,048 A | 2/1983 | Hansen | |
| 4,458,774 A | 7/1984 | Sieren | |
| 4,707,021 A | 11/1987 | Meier et al. | |
| 5,193,636 A | 3/1993 | Holm | |
| 5,244,186 A * | 9/1993 | Chandler | E04F 11/1812 248/223.41 |
| 6,030,029 A | 2/2000 | Tsuda et al. | |
| 6,068,675 A | 5/2000 | Tsuda et al. | |
| 6,206,122 B1 | 3/2001 | Boothman et al. | |
| 6,401,851 B1 | 6/2002 | Keen | |
| 7,237,636 B2 * | 7/2007 | Ruppert | B60R 3/00 180/210 |
| 7,752,732 B2 * | 7/2010 | Brown | F16B 13/002 29/525.05 |

(Continued)

FOREIGN PATENT DOCUMENTS

GB    2017595    10/1979

*Primary Examiner* — Darlene P Condra

(74) *Attorney, Agent, or Firm* — Rebecca L. Henkel; Rickard K. DeMille

(57) ABSTRACT

An engine compartment side panel is configured for toolless mounting and includes a main body having an outer surface, an inner surface, and a bottom edge. The side panel further includes at least one tab disposed at a location along a length of the bottom edge of the main body. In addition, a handrail is coupled to an outer surface of the main body at a plurality of handrail mounting locations and at least one mounting arm is coupled to an inner surface of the main body at a respective one of an at least one mounting arm mounting locations. Each mounting arm is configured to be removably coupled to an engine compartment support frame. Further, each of the at least one mounting arm mounting location is aligned with a respective one of the plurality of handrail mounting locations.

20 Claims, 9 Drawing Sheets

(56) References Cited

U.S. PATENT DOCUMENTS

| | | |
|---|---|---|
| 9,174,682 B2 | 11/2015 | Schmitz |
| 2005/0103546 A1 | 5/2005 | Bedard et al. |
| 2009/0242864 A1* | 10/2009 | Carney ............... E04F 11/1804 256/59 |
| 2010/0067975 A1* | 3/2010 | Brown .................. F16B 13/001 403/22 |
| 2012/0325570 A1* | 12/2012 | Rogers .................. B62D 25/10 180/89.17 |
| 2017/0313255 A1* | 11/2017 | Brett ..................... B60P 3/2205 |

* cited by examiner

ENGINE COMPARTMENT SIDE PANEL WITH TOOLLESS MOUNTING

FIELD OF THE INVENTION

The invention relates generally to agricultural product application equipment or agricultural machines such as self-propelled sprayers and, in particular, to an engine compartment side panel that may be removed and mounted without the use of tools.

BACKGROUND OF THE INVENTION

High-clearance sprayers are getting larger and more complex to allow for increasing coverage in a single pass, which improves application efficiency. These high-clearance sprayers require high horsepower engines with numerous engine drive accessories and systems such as exhaust after-treatment systems that need to be mounted near the engine. Inspecting and servicing these accessories and systems can present challenges because of limited space inside of engine compartments.

Current design of the engine enclosure has numerous different panels and covers supported by an outer engine frame. Some of the panels and covers can be individually opened to allow access to different areas within the engine compartment. These include a pair of side covers or panels to allow access into the side portions of the engine compartment. Current side covers include a hydro cover that is hinged mounted and can pivot open at one side of the engine enclosure, with a panel secured by fasteners to the outer engine frame to cover the rest of that side of the engine compartment. At the outer side engine compartment, a panel is bolted through a vertically extending flange at an outer side of the panel to the outer engine frame. The numerous fasteners to secure the panels require time for initial assembly. During use by an operator, the numerous fasteners to secure the panels require time for removal and installation of the panel during inspection or servicing of components behind the panels.

Therefore, it is desired to provide a side panel for the engine compartment that is able to be removed and mounted without the use of numerous fasteners and tools, which would allow quicker and easier access to the components within the engine compartment for service and general maintenance.

SUMMARY OF THE INVENTION

The present invention is directed to an engine compartment side panel for an agricultural vehicle. The engine compartment side panel is able to be removed from and mounted to the engine compartment of the agricultural vehicle without the use of tools and, therefore, allowing easy access to the engine compartment of the agricultural vehicle for service and general maintenance.

According to one aspect of the invention, an engine compartment side panel includes a main body having an outer surface, an inner surface, and a bottom edge. The side panel further includes at least one tab disposed at a location along a length of the bottom edge of the main body. In addition, a handrail is coupled to an outer surface of the main body at a plurality of handrail mounting locations and at least one mounting arm is coupled to an inner surface of the main body at a respective one of an at least one mounting arm mounting locations. Each mounting arm is configured to be removably coupled to an engine compartment support frame. Further, each of the at least one mounting arm mounting location is aligned with a respective one of the plurality of handrail mounting locations.

In a further aspect of the invention, each mounting arm includes a bracket and a locking assembly. The locking assembly includes an inner element, an outer element, and a threaded protrusion configured to pass through a respective slot formed in the engine compartment support frame. An outer contour of the inner element is configured to interlock with an inner contour of the outer element when the inner element is disposed within the outer element. Further, a nut is configured to interfit with the threaded protrusion and removably couple the side panel to the engine compartment support frame.

According to another aspect of the invention, a method of manufacturing an engine compartment side panel includes providing a main body, coupling at least one tab adjacent a bottom edge of the main body, coupling a handrail to an outer surface of the main body at a plurality of outer surface mounting locations, and coupling at least one mounting arm to an inner surface of the main body at at least one inner surface mounting location. The at least one inner surface mounting location is aligned with a respective one of the plurality of outer surface mounting locations. Further, each mounting arm is configured to be removably coupled to an engine compartment support frame.

In a further aspect of the invention, coupling the at least one mounting arm to an inner surface of the main body includes coupling a bracket to the inner surface of the main body, and coupling a locking assembly to the bracket. The locking assembly has a threaded protrusion configured to pass through a respective slot formed in the engine compartment support frame.

In yet a further aspect of the invention, coupling a locking assembly to the bracket includes coupling an inner element to the bracket, and disposing the inner element within an outer element. The inner element has an outer contour configured to interlock with an inner contour of the outer element.

According to yet another aspect of the invention, an engine compartment includes a support frame disposed within the engine compartment and a side panel. The side panel includes a main body, at least one tab disposed adjacent a bottom edge of the main body, a handrail coupled to an outer surface of the main body and including a plurality of mounting portions disposed at a respective one of a plurality of outer surface mounting locations, and at least one mounting arm coupled to an inner surface of the main body at at least one inner surface mounting locations. Each mounting arm is configured to be removably coupled to the support frame. Additionally, the at least one inner surface mounting location aligns with a respective one of the plurality of outer surface mounting locations.

In a further aspect of the invention, the at least one mounting arm includes a bracket coupled to the inner surface of the main body, and a locking assembly coupled to the bracket.

In yet a further aspect of the invention, the locking assembly includes an outer element, an inner element secured within the outer element and coupled to the bracket, a threaded portion disposed within the outer element and extending outward to interfit with a respective slot formed in the support frame, a nut configured to interfit with the threaded protrusion and removably couple the side panel to the support frame. Further, the inner element both include contours configured to interlock with each other when the inner element is disposed within the outer element.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
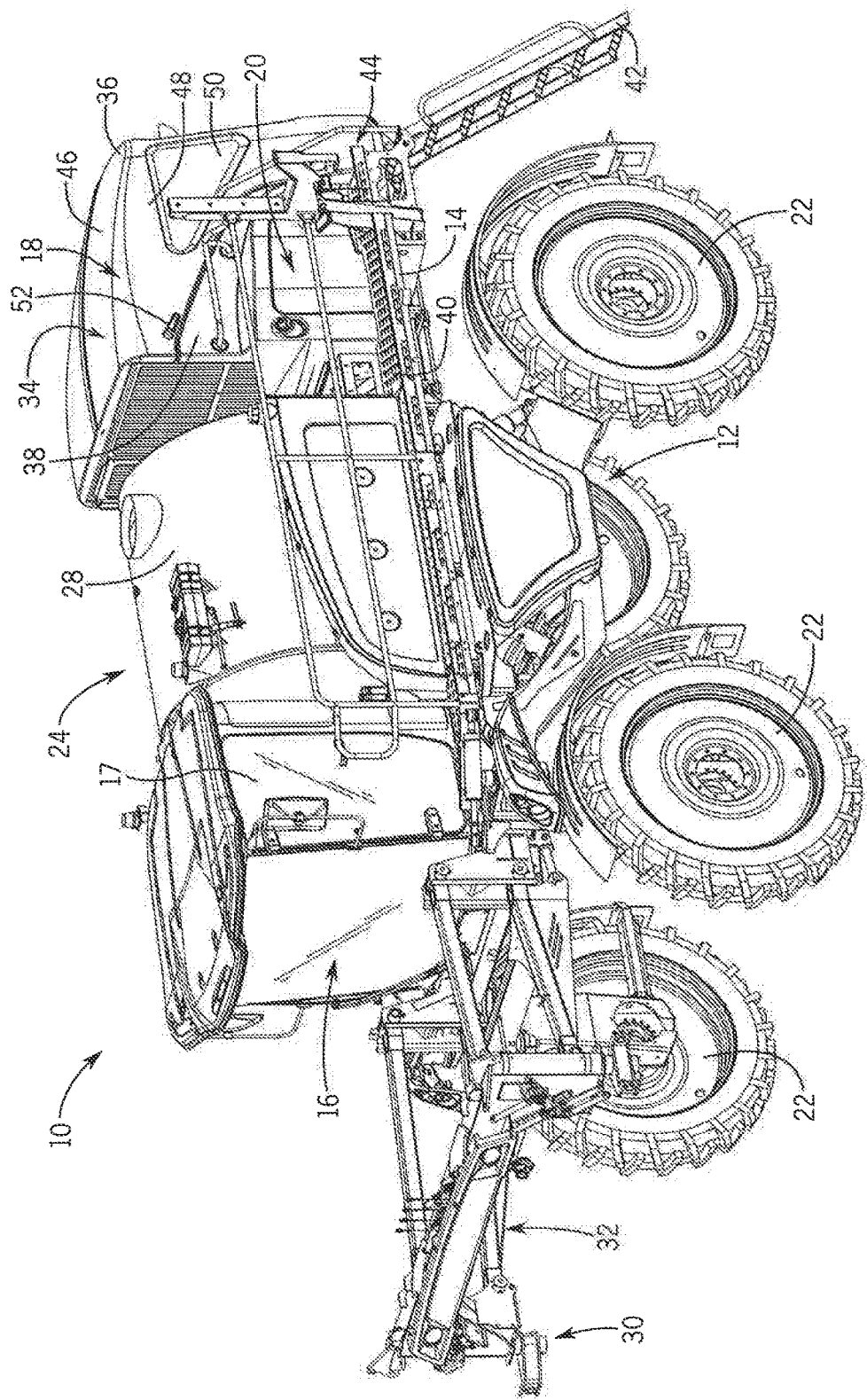
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

The engine 18 and the engine accessory system 34 are housed within an engine compartment 36. As shown in FIG. 1, the engine compartment 36 includes at least one side panel 38. While the representative embodiment of the invention depicts the side panel 38 as disposed on specific side of the engine compartment 36, alternative embodiments of the invention may include the side panel 38 on any side of the engine compartment 36 or any number of side panels 38 on any combination of sides of engine compartment 36.

The sprayer 10 may also include a walkway 40 disposed on the chassis frame 14 along a side of the sprayer 10. As shown in FIG. 1, a ladder 42 extends from rear end 44 of the walkway 40 located adjacent the engine compartment 36. The ladder 42 provides a user with a means to climb onto the walkway 40. In turn, the walkway 40 extends from the engine compartment 36 to the operator cab 16.

Figure 2:
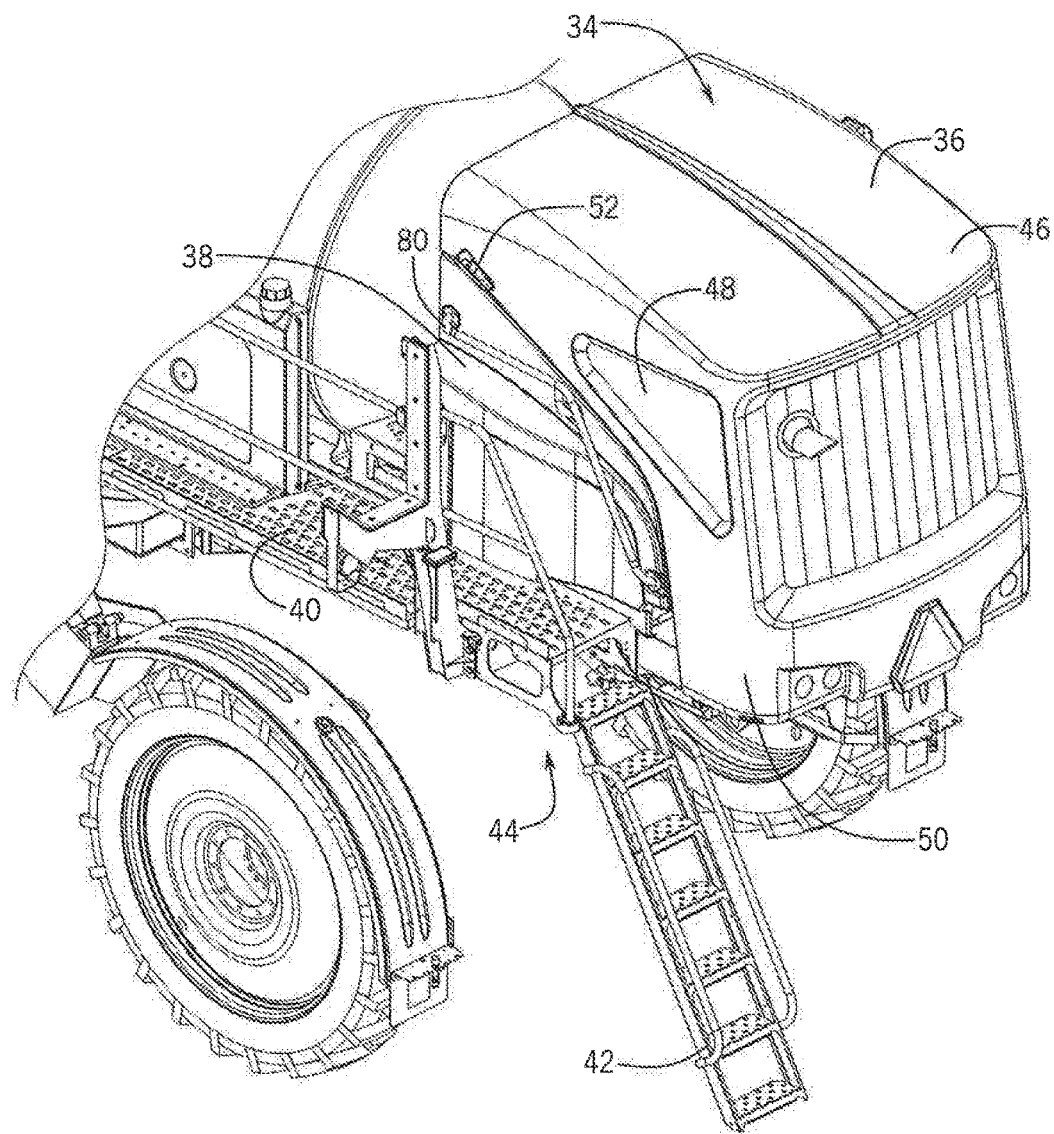
FIG. 2 is an enlarged isometric view of an engine compartment of the agricultural machine of FIG. 1, according to an embodiment of the invention.

FIG. 2 illustrates an additional isometric view of the agricultural machine 10 and specifically focuses on the engine compartment 36 of the agricultural machine 10. As shown, the engine compartment 36 includes a side panel 38 and a main hood 46. The main hood 46 includes a side portion 48, which in conjunction with the side panel 38 forms an entire side 50 of the engine compartment 36. The side portion 48 includes a handle 52 that interacts with a latching mechanism (to be described in further detail below) to release the side panel 38 and allow for its removal by a user.

While the representative embodiment of the invention illustrates the handle 52 as being disposed on the side portion 48 of the main hood 46 of the engine compartment 36, it is also contemplated that the handle 52 may be located at any other location on the engine compartment 36, including, but not limited to, a location on the side panel 38.

Figure 3:
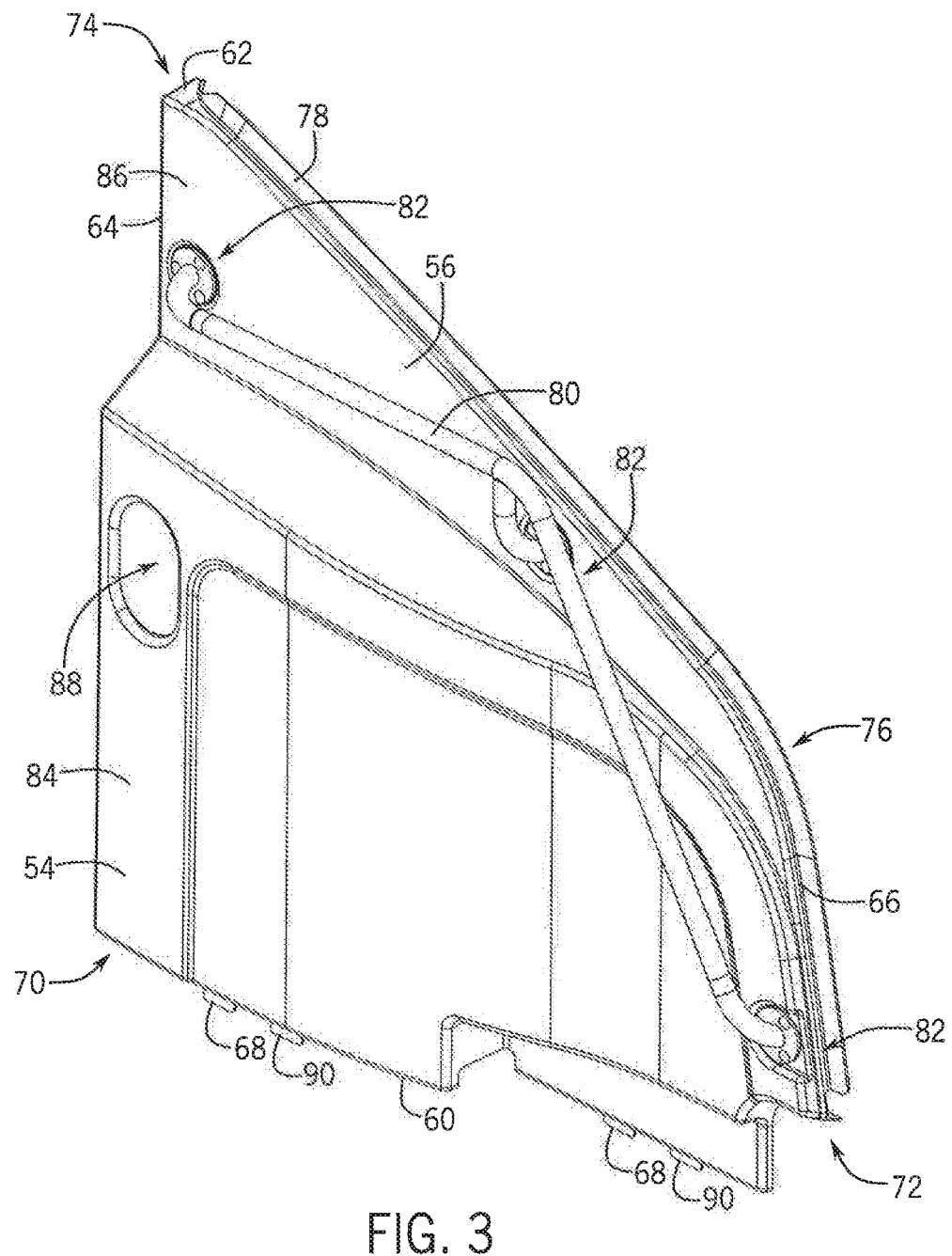
FIG. 3 is an isometric view of an engine compartment side panel of the engine compartment, according to an embodiment of the invention.
Figure 4:
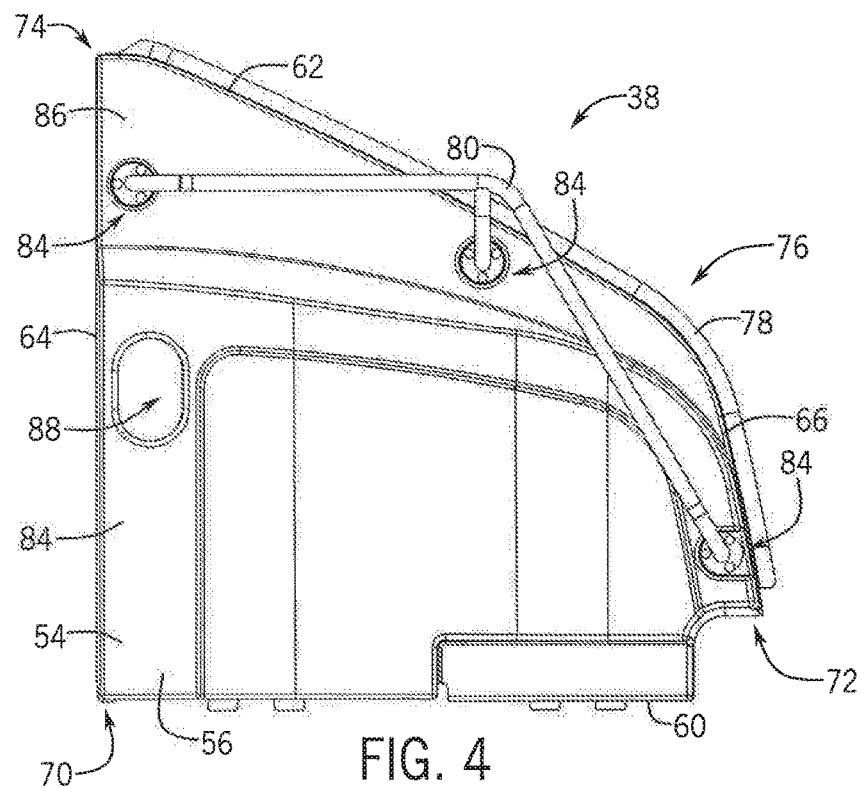
FIG. 4 is a side view of an outer side of the engine compartment side panel of FIG. 3, according to an embodiment of the invention.
Figure 5:
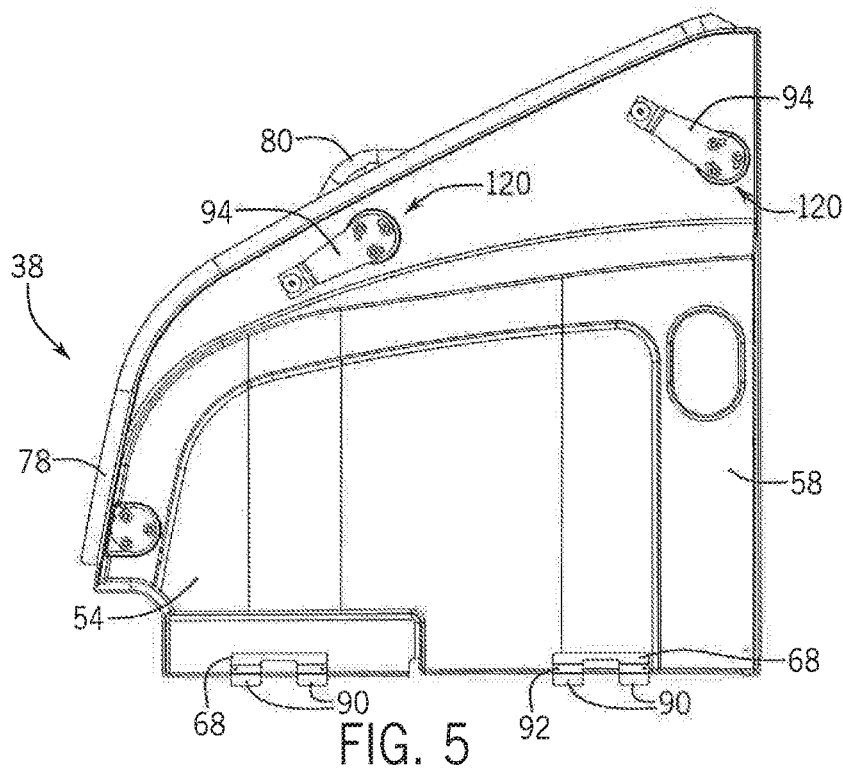
FIG. 5 is a side view of an inner side of the engine compartment side panel of FIG. 3, according to an embodiment of the invention.

Next, FIGS. 3-5 illustrate the side panel 38, according to an embodiment of the invention. The side panel 38 includes a main body 54 having an outer surface 56 (shown in FIG. 4), and inner surface 58 (shown in FIG. 5), a bottom edge 60, a top edge 62, a first side edge 64, and a second side edge 66. At least one tab 68 is disposed at the bottom edge 60 of the main body 54 and extends downward therefrom. In the representative embodiment of the invention, the side panel 38 includes two (2) tabs 68. However, alternative embodiments of the invention may use more or less than two (2) tabs 68.

The bottom edge 60 extends between the bottom end 70 of the first side edge 64 and the bottom end 72 of the second side edge 66. Meanwhile, the top edge 62 extends between the top end 74 of the first side edge 64 and the top end 76 of the second side edge 66. As shown in FIG. 3, the first side edge 64 is longer than the second side edge 66, resulting in the main body 54 of the side panel 38 having a non-rectangular shape. However, in alternative embodiments of the invention, the second side edge 66 may have any length less than, greater than, or equal to the length of the first side edge 64. Further, the main body 54 and side panel 38 may be in the form of any shape and is not limited to the non-rectangular shape illustrated in FIG. 3-5.

The edges 60, 62, 64, 66 of the side panel 38 are configured to extend perpendicular from the main body 54 in the direction of the inner surface 58 of the main body 54. However, in alternative embodiments of the invention, the edges 60, 62, 64, 66 of the side panel 38 may independently extend from the main body 54 at any angle.

The side panel 38 may also include a flange 78 extending from the top edge 62 and the second side edge 66 of the main body 54. In the representative embodiment of the invention, the flange 78 is depicted as a continuous flange extending perpendicular from the top edge 62 and the second side edge 66. In other embodiments of the invention, the flange 78 may include a single flange or a series of flanges spaced apart from each other and extending from at least one of the top edge 62 and the second side edge 66 at any angle.

The side panel 38 may also include a handrail 80 coupled to the outer surface 56 of the main body 54 of the side panel 38. The handrail 80 is coupled to the outer surface 56 at a plurality of handrail mounting locations 82. While FIGS. 3-5 illustrate the use of three (3) handrail mounting locations 82, other embodiments of the invention may use any number of handrail mounting locations 82 more or less than three (3). The handrail 80 provides a lift point and allows the user to lift and remove the side panel 38 from the engine compartment 36. Additionally, the handrail 80 provides support for a user using the walkway 40 and the ladder 42, as shown in FIG. 1.

In the representative embodiment of the invention, the main body 54 of the side panel 38 may also include a tank portion 84 and a wall portion 86. The tank portion 84 is a raised area of the main body 54 that extends outward from the wall portion 86 and is configured to provide additional volume within the engine compartment 36 for an associated tank (not shown). The main body 54 may also include an aperture 88 formed in the tank portion 84 of the main body 54. In other embodiments of the invention, the aperture 88 may be formed in the wall portion 86 of the main body 54. The aperture 88 is configured to allow access to the associated tank (not shown) for activities such as, but not limited to, refilling the tank without having to remove the side panel 38. While FIGS. 3-5 depict the tank portion 84 being disposed at the lower half of the main body 54, it is contemplated that the tank portion 84 may be located anywhere within the main body 54 of the side panel 38.

As shown in FIG. 5, the tabs 68 may be coupled to the inner surface 58 of the main body 54 of the side panel 38 at at least one location along or adjacent the bottom edge 60 of the side panel 38. While the representative embodiment of the invention depicts the use of two (2) tabs having two (2) protrusions 90 each, it is contemplated that other embodiments of the invention may include more or less than two (2) tabs 68. Further, each tab 68 may include more or less than two (2) protrusions 90 extending beyond the bottom edge 60 of the side panel 38. Further, the representative embodiment of the invention illustrates each tab 68 having a contoured section 92 configured to contour around the bottom edge 60 of the side panel 38. In other embodiments of the invention, the bottom edge 60 of the side panel 38 may include at least one cutout (not shown) configured to allow a respective tab 68 to extend through the at least one cutout.

The side panel 38 includes at least one mounting arm 94 secured to the inner surface 58 of the main body 54. The configuration of the mounting arm 94 will be described in further detail later, with respect to FIG. 9-11.

Figure 6:
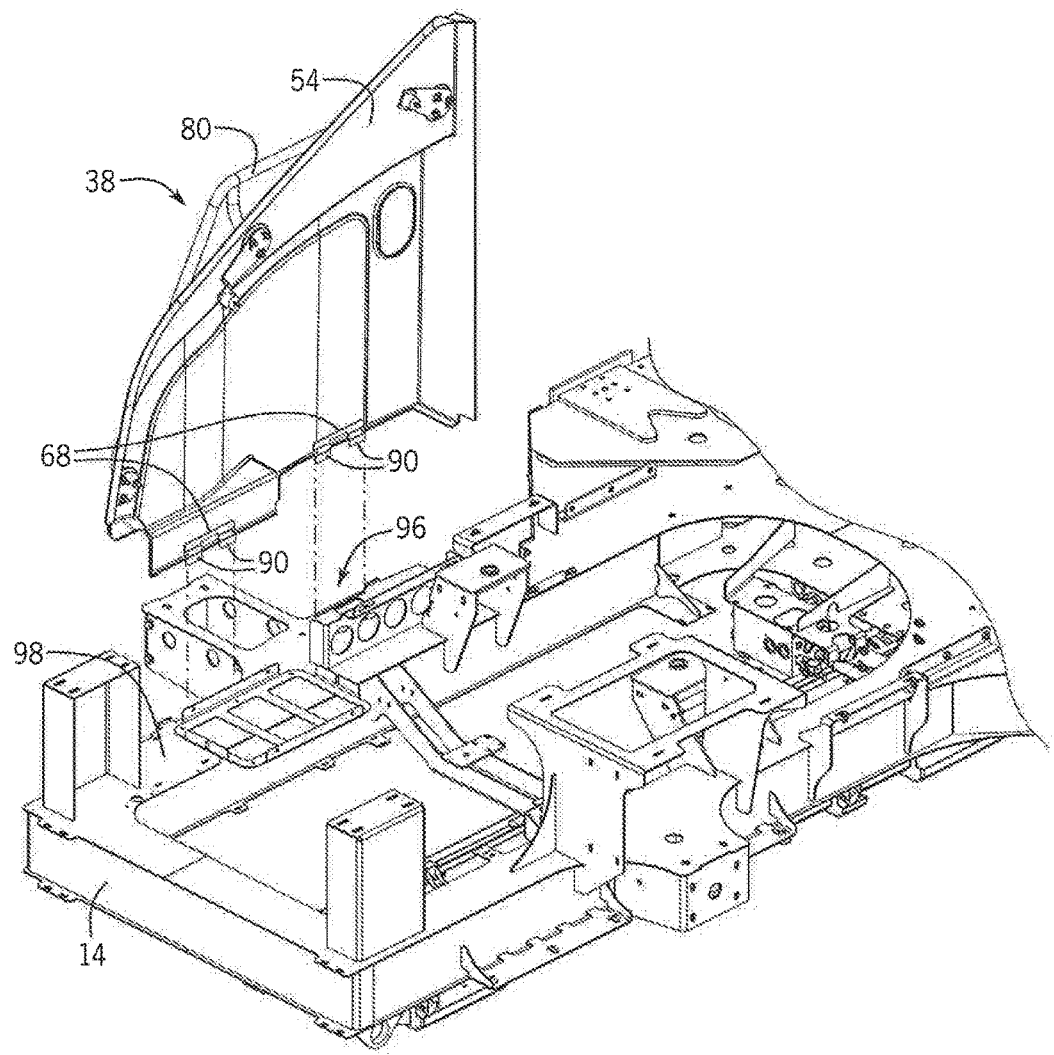
FIG. 6 is an exploded isometric view of the interfit between engine compartment side panel and a chassis frame of the agricultural machine, according to an embodiment of the invention.
Figure 7:
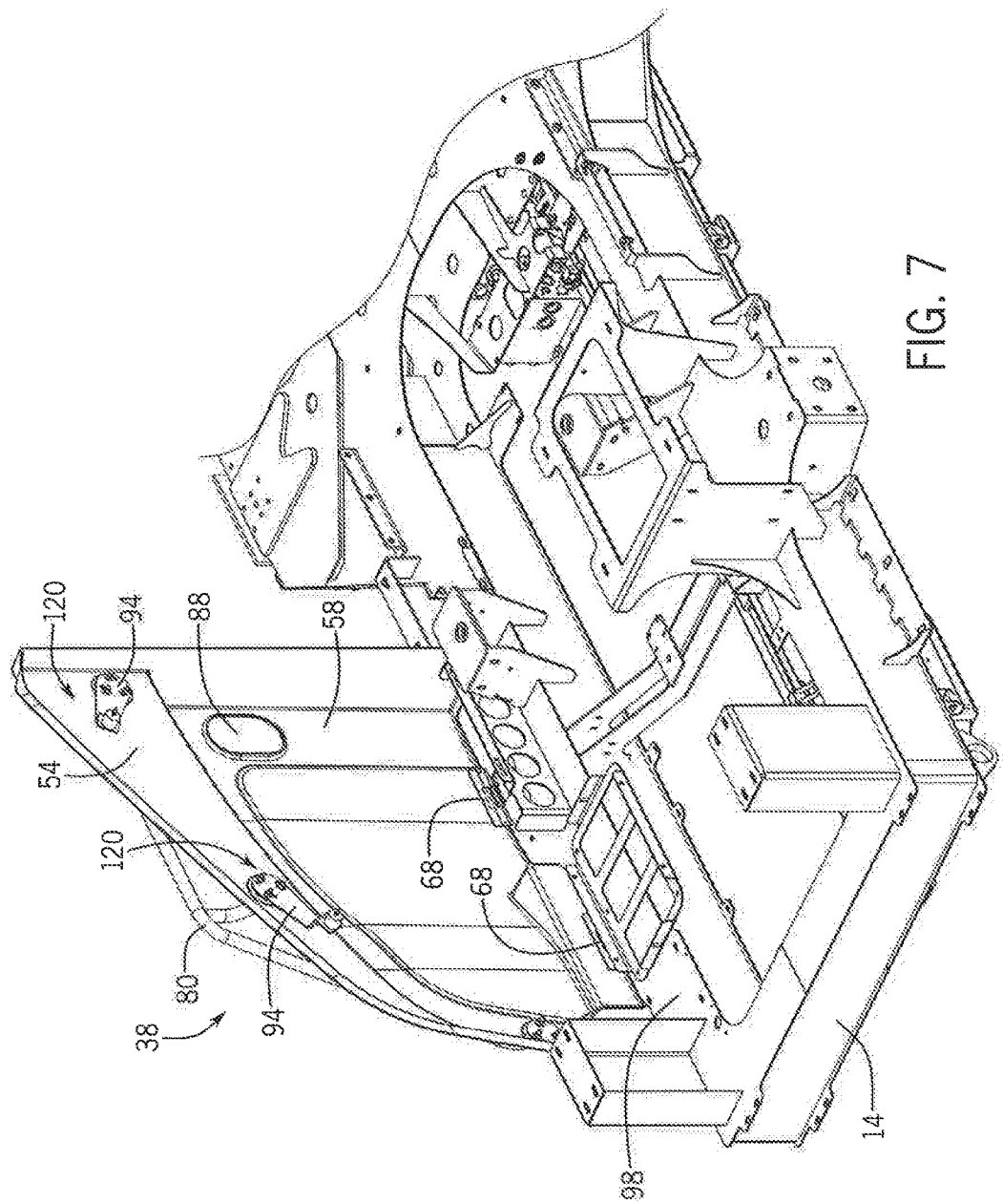
FIG. 7 is an isometric view of the interfit between the engine compartment side panel and the chassis frame of the agricultural machine, according to an embodiment of the invention

Now referring to FIGS. 6-7, the interfitting of the side panel 38 and the chassis frame 14 is shown. For example, the chassis frame 14 includes at least one slot 96 formed in a top surface 98 of the chassis frame 14. Each slot 96 is configured to receive a respective tab 68. As such, when the side panel 38 is mounted, the bottom edge 60 of the side panel 38 may be in contact with the top surface 98 of the chassis frame 14. While FIG. 6 depicts the use of two (2) slots 96 configured to receive two (2) tabs 68, other embodiments of the inventions may use more of less than two (2) slots 96 configured to receive more or less than two (2) tabs 68. In further alternative embodiments of the invention, a plurality of slots 96 may be formed in the top surface 98 of the chassis frame 14 and configured to each receive an individual protrusion 90 of the tabs 68. As a result, it is contemplated that the number of slots 96 formed in the top surface 98 of the chassis frame 14 may correlate to the number of tabs 68 of the side panel 38, the number of protrusions 90 of the tabs 68 of the side panel 38, or any combination thereof.

Figure 8:
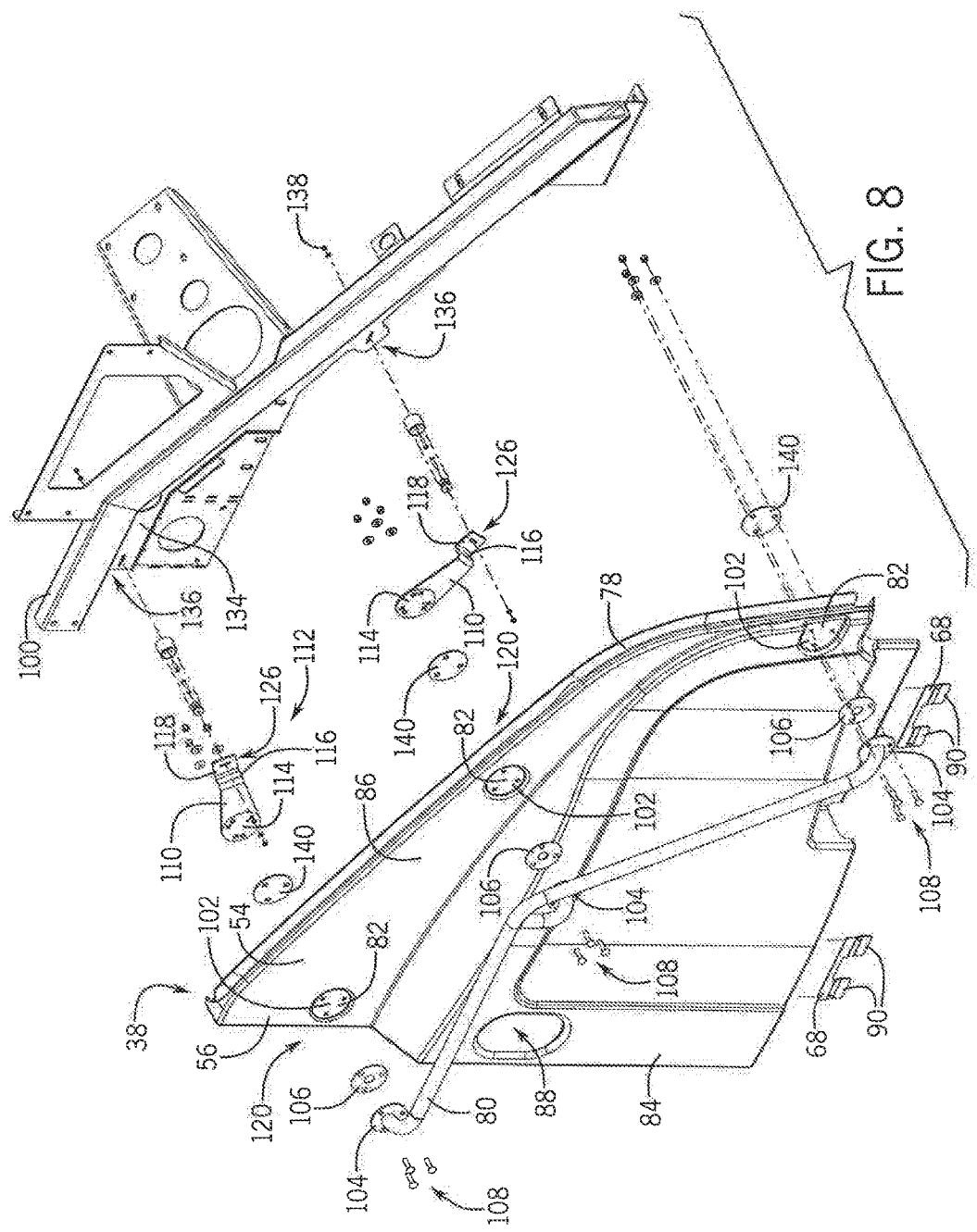
FIG. 8 is an exploded isometric view of the interfit between the engine compartment side panel and an engine compartment support frame, according to an embodiment of the invention.

Next, FIGS. 8-11 depict the interfit between the side panel 38 and a support frame 100 within the engine compartment 36. In particular, FIG. 8 depicts an exploded isometric view of the side panel 38 and the support frame 100. In the representative embodiment of the invention, each handrail mounting location 82 includes a recessed portion 102 configured to receive a mounting portion 104 of the handrail 80. A mounting disk 106 is disposed between each mounting portion 104 and its respective recessed portion 102. As such, the number of mounting portions 104 and mounting disks 106 correlates with the number of handrail mounting locations 82 on the outer surface 56 of the main body 54. Further, each respective mounting portion 82 and mounting disk 86 are coupled together and to the main body 54 via a plurality of fasteners 108.

Figure 9:
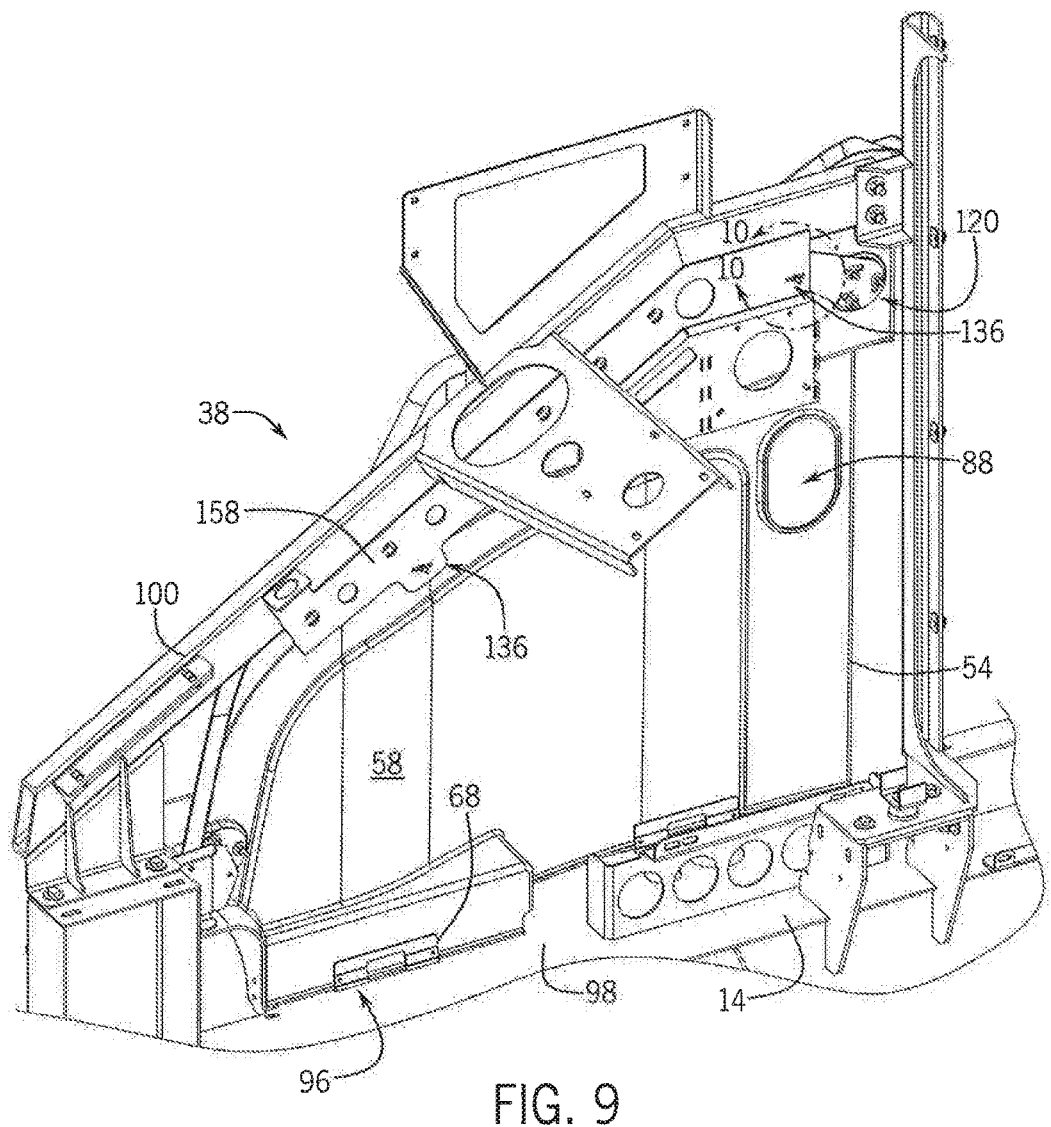
FIG. 9 is an isometric view of the interfit between the engine compartment side panel and the engine compartment support frame, according to an embodiment of the invention.

While FIG. 9 illustrates the use of three (3) fasteners 108 for each combination of mounting portions 104 and mounting disks 106, any number of fasteners 108 may be used. In alternative embodiments of the invention, the mounting portions 104 and mounting disks 106 may be coupled together and to the recessed portion 102 of the mounting locations 82 of main body 54 by means other than fasteners 108. Further, in the representative embodiment of the invention, the mounting portions 104 of the handrail 80, the handrail mounting locations 82, and the mounting disks 106 are each circular in shape. However, it is contemplated that they may be any shape in other embodiments of the invention.

It is further contemplated that in other embodiments of the invention the mounting locations 82 may not include recessed portions 102. In other embodiments of the invention, the mounting portions 104 of the handrail 80 may be directly coupled to the mounting locations 82 of the main body 54 without mounting disks 106 disposed therebetween.

As previously mentioned and shown in FIGS. 5-7, the side panel 38 includes at least one mounting arm 94. Each mounting arm 94 includes a bracket 110 and a locking assembly 112. In the representative embodiment of the invention, the bracket 110 is in the form of an s-bracket having a number of portions 114, 116, 118. However, in alternative embodiments of the invention, the bracket 110 may be in any shape and include any number of portions more or less than three (3). The first portion 114 of the mounting arm 94 is configured to be mounted to the inner surface 58 of the main body 54 of the side panel 38 at a respective mounting location 120. The second portion 116 extends from an end 122 of the first portion 114. While FIG. 8 illustrates the second portion 116 extending perpendicular from the first portion 114, it is contemplated that the second portion 116 may extend from the first portion 114 at any angle. The third portion 118 extends from the second portion 1116 at an end 124 opposite the first portion 114. In the representative embodiment of the invention, the third portion 118 extends perpendicular from the second portion 116, but in other embodiments of the invention, the third portion 118 may extend from the second portion 116 at any angle. The third portion 118 includes a slot 126 formed therein and configured to allow the locking assembly 112 to be coupled to the bracket 110 to form the mounting arm 94. As a result of the configuration described above, the third portion 118 of the bracket 110 is spaced apart from the inner surface 58 of the main body 54 of the side panel.

The locking assembly 112 of the mounting arm 94 is mounted to the bracket 110 via a fastener 128 configured to interfit with the slot 126 of the bracket 110. The locking assembly includes a spacer 130 and a threaded protrusion 132 extending outward from the spacer 130. Additional elements of the locking assembly 112 will be described with respect to FIG. 11.

As further shown in FIGS. 8 and 9, an outer surface 134 of the engine compartment support frame 100 includes at least one slot 136 formed therethrough. Each slot 136 is configured to receive the threaded protrusion 132 of the locking assembly 112 of a respective mounting arm 94. In turn, a respective nut 138 is configured to interfit with each threaded protrusion 132 in order to removably couple the side panel 38 to the engine compartment support frame 100. The nut 138 is able to be removed from the threaded protrusion 132 quickly and by hand. As a result, no tool is needed to remove each nut 138 from each threaded protrusion 132.

As shown in FIG. 8, each mounting location 120 on the inner surface 58 aligns with a respective mounting location 82 on the outer surface 56. As shown in the representative embodiment of the invention, since the mounting arms 94 are aligned with a respective handrail mounting portion 104, each set of fasteners 108 coupling a hand rail mounting portion 104 to the outer surface 56 of the main body 54 may also couple the aligned mounting arm 94. In alternative embodiments of the invention, aligned mounting arms 94 and handrail mounting portions 104 may be coupled to the inner and outer surfaces 58, 56, respectively, via separate sets of fasteners.

While the representative embodiment of the invention illustrates the use of two (2) mounting arms and, as a result (2) mounting locations 120 in conjunction with three (3) mounting locations 82, it is contemplated that the invention may include any number of mounting locations 120 equal to or less than the number of mounting locations 82. As shown in FIG. 8, if the number of mounting locations 120 is less than the number of mounting locations 82, a mounting disk 140 may or may not be coupled to the inner surface 58 of the main body 54 in alignment with the remaining mounting locations 82. In addition, the mounting disk 140 may be coupled to the inner surface 58 of the main body 54 by the same set of fasteners 108 or a different set of fasteners.

Similar to the mounting portions 104 of the handrail 80, a mounting disk 140 may or may not be disposed between the first portion 114 of the mounting arm 94 and the inner surface 58 of the side panel 38.

Figure 10:
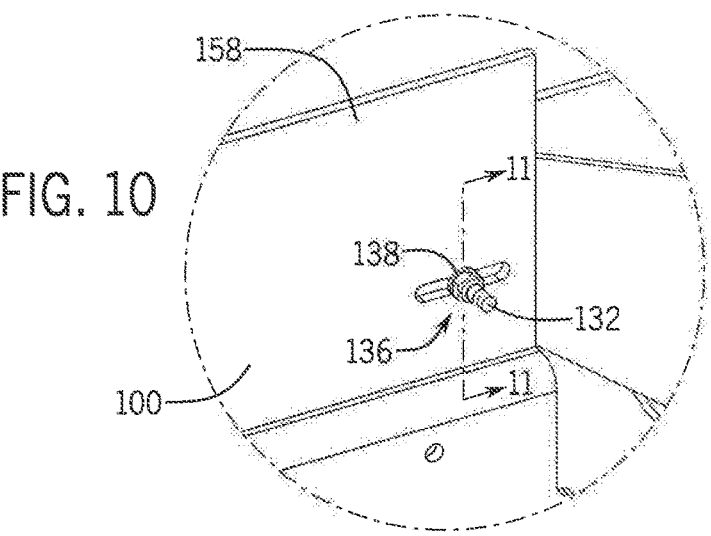
FIG. 10 is an enlarged isometric view of the segment 10-10 of FIG. 9, according to an embodiment of the invention.

FIGS. 9 and 10 further illustrate each threaded protrusion 132 extending through its respective slot 136 in the engine compartment support frame 100 and interfitting with a nut 138. As a result, the side panel 38 is removably coupled to the engine compartment support frame 100.

Figure 11:
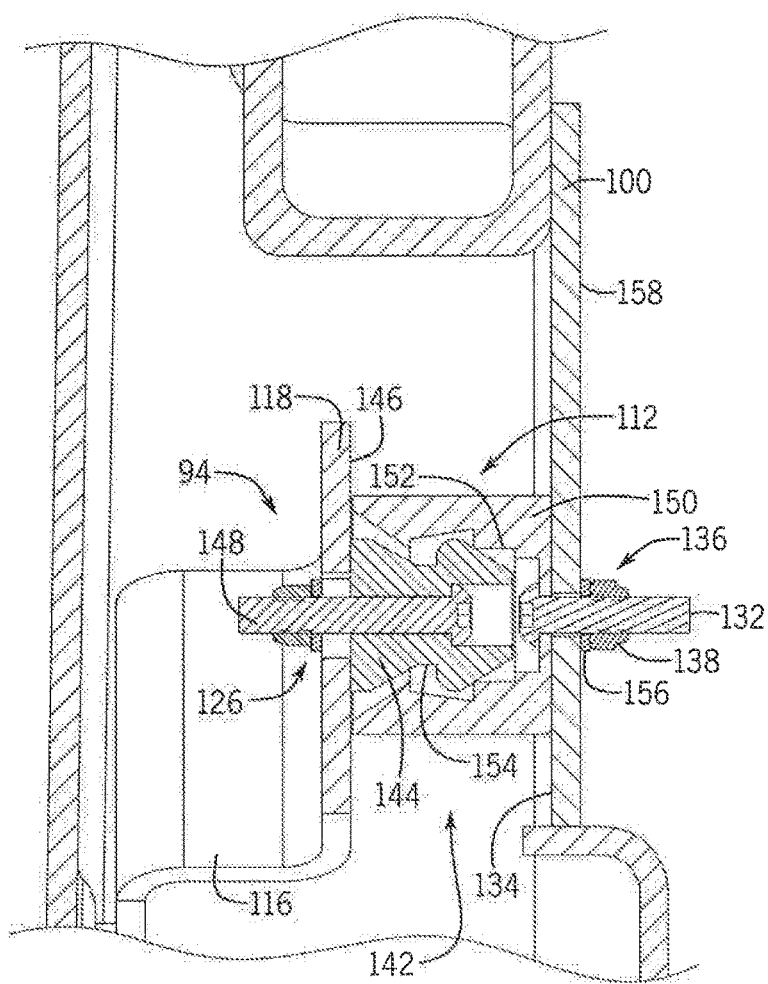
FIG. 11 is a cross-section view of FIG. 10 taken along line 11-11, according to an embodiment of the invention.

Now referring to FIG. 11, a cross-sectional view of the locking assembly 112 of the mounting arm 94 is shown. The locking assembly 112 includes a spacer 142 disposed between the third portion 118 of the bracket 110 and the outer surface 134 of the engine compartment support frame 100. The spacer 142 includes an inner element 144 coupled to an outer surface 146 of the third portion 118 of the bracket 110 by way of a fastener 148. The inner element 144 is disposed within an outer element 150. The outer element 150 includes an inner contour 152 configured to interlock with an outer contour 154 of the inner element 144. As a result, when the inner element 144 is disposed within the outer element 150, the inner element 144 is securely fastened within the outer element 150.

The earlier discussed threaded portion 132 is disposed within the outer element 150 and extends out therefrom in a direction toward the support frame 100. FIG. 11 further depicts nut 138 interfitting with the threaded protrusion 132 in order to removably couple the side panel 38 to the support frame 100. In some embodiments of the invention, a washer 156 may be disposed between the nut 138 and an inner surface 158 of the support frame 100, while other embodiments of the invention may omit the washer 156.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An engine compartment side panel comprising:
    a main body having an outer surface, an inner surface, and a bottom edge;
    at least one tab disposed at a respective at least one location along a length of the bottom edge of the main body;
    a handrail coupled to the outer surface of the main body at a plurality of handrail mounting locations;
    at least one mounting arm coupled to the inner surface of the main body at a respective one of an at least one mounting arm mounting locations, each mounting arm being configured to be removably coupled to an engine compartment support frame; and
    wherein the at least one mounting arm mounting location aligns with a respective one of the plurality of handrail mounting locations.

2. The engine compartment side panel of claim 1 wherein each of the at least one mounting arm includes a bracket and a locking assembly.

3. The engine compartment side panel of claim 2 wherein each locking assembly includes a threaded protrusion configured to pass through a respective slot formed in the engine compartment support frame; and
    wherein a nut is configured to interfit with the threaded protrusion and removably couple the engine compartment side panel to the engine compartment support frame.

4. The engine compartment side panel of claim 3 wherein each locking assembly further includes an inner element having an outer contour and an outer element having an inner contour; and
wherein the outer contour and the inner contour are configured to interlock when the inner element is disposed within the outer element.

5. The engine compartment side panel of claim 1 further comprising a flange extending from at least one of a top edge and a side edge of the main body.

6. The engine compartment side panel of claim 1 wherein the main body includes a wall portion and a tank portion.

7. The engine compartment side panel of claim 1 further comprising a mounting disk disposed at each handrail mounting location between the handrail and the outer surface of the main body.

8. The engine compartment side panel of claim 1 further comprising a mounting disk disposed at each mounting arm mounting location between the mounting arm and the inner surface of the main body.

9. A method of manufacturing an engine compartment side panel comprising:
providing a main body;
coupling at least one tab adjacent a bottom edge of the main body;
coupling a handrail to an outer surface of the main body at a plurality of outer surface mounting locations;
coupling at least one mounting arm to an inner surface of the main body at at least one inner surface mounting location, the at least one inner surface mounting location being aligned with a respective one of the plurality of outer surface mounting locations; and
wherein each of the at least one mounting arm is configured to be removably coupled to an engine compartment support frame.

10. The method of claim 9 further comprising disposing at least one mounting disk between the handrail and the outer surface of the main body at a respective one of the plurality of outer surface mounting locations.

11. The method of claim 9 further comprising disposing at least one mounting disk between a respective one of the at least one mounting arm and the inner surface of the main body at a respective one of the at least one inner surface mounting locations.

12. The method of claim 9 wherein coupling the at least one mounting arm to an inner surface of the main body comprises;
coupling a bracket to the inner surface of the main body; and
coupling a locking assembly to the bracket, the locking assembly having a threaded protrusion configured to pass through a respective slot formed in the engine compartment support frame.

13. The method of claim 12 wherein coupling a locking assembly to the bracket comprises:
coupling an inner element to the bracket; and
disposing the inner element within an outer element, the inner element having an outer contour configured to interlock with an inner contour of the outer element.

14. An engine compartment of a piece of agricultural product application equipment, comprising:
a support frame disposed within the engine compartment; and
a side panel comprising:
a main body;
at least one tab disposed adjacent a bottom edge of the main body;
a handrail coupled to an outer surface of the main body, the handrail including a plurality of mounting portions disposed at a respective one of a plurality of outer surface mounting locations;
at least one mounting arm coupled to an inner surface of the main body at at least one inner surface mounting locations, each of the at least one mounting arm being configured to be removably coupled to the support frame; and
wherein the at least one inner surface mounting location aligns with a respective one of the plurality of outer surface mounting locations.

15. The engine compartment of claim 14 wherein each of the at least one mounting arm comprises:
a bracket coupled to the inner surface of the main body; and
a locking assembly coupled to the bracket.

16. The engine compartment of claim 1 wherein the locking assembly comprises:
an outer element;
an inner element secured within the outer element and coupled to the bracket;
a threaded portion disposed within the outer element and extending outward to interfit with a respective slot formed in the support frame; and
a nut configured to interfit with the threaded protrusion and removably couple the side panel to the support frame.

17. The engine compartment of claim 14 wherein the inner element includes a contour, the outer element includes a contour, and the contour of the inner element is configured to interlock with the contour of the outer element when the inner element is disposed within the outer element.

18. The engine compartment of claim 14 wherein the side panel further comprises a mounting disk disposed at each outer surface mounting location between the respective one of a plurality of mounting portion and the outer surface of the main body.

19. The engine compartment of claim 14 wherein the side panel further comprises a mounting disk disposed at each inner surface mounting location between the respective one of the at least one mounting arm and the inner surface of the main body.

20. The engine compartment of claim 14 further comprising a chassis frame having at least one slot;
wherein the at least one tab of the side panel is configured to interfit with a respective one of the at least one slot of the chassis frame.

* * * * *